United States Patent
Davis et al.

[11] Patent Number: 5,897,823
[45] Date of Patent: Apr. 27, 1999

[54] METHOD OF FORMING A PLASTIC CONTAINER COMPONENT AND THE PLASTIC CONTAINER COMPONENT FORMED BY THE METHOD

[75] Inventors: Darrell Davis, Indianapolis; Alan Zellers, Carmel, both of Ind.

[73] Assignee: North America Packaging Corporation, Atlanta, Ga.

[21] Appl. No.: 08/666,232

[22] Filed: Jun. 20, 1996

[51] Int. Cl.[6] .......................... B29C 33/12; B29C 45/14
[52] U.S. Cl. .......................... 264/266; 264/268; 264/275
[58] Field of Search ........................ 264/251, 252, 264/254, 267, 268, 271.1, 328.13, 513, 266, 274, 275

[56] References Cited

U.S. PATENT DOCUMENTS

| | | | |
|---|---|---|---|
| 3,082,587 | 3/1963 | Brimberg | 264/254 |
| 3,200,444 | 8/1965 | Davis | 264/328.13 |
| 3,366,019 | 1/1968 | McGee . | |
| 3,397,814 | 8/1968 | Zackheim . | |
| 3,493,458 | 2/1970 | Santangelo . | |
| 3,493,645 | 2/1970 | Sanderson et al. . | |
| 3,680,187 | 8/1972 | Murray . | |
| 3,956,550 | 5/1976 | Sutch . | |
| 3,971,841 | 7/1976 | Rubinstein . | |
| 4,088,729 | 5/1978 | Sherman . | |
| 4,222,974 | 9/1980 | Smith . | |
| 4,236,629 | 12/1980 | Dwinell . | |
| 4,320,861 | 3/1982 | Rieke et al. . | |
| 4,342,799 | 8/1982 | Schwochert | 264/273 |
| 4,366,609 | 1/1983 | Speer | 264/266 |
| 4,435,142 | 3/1984 | Morita et al. | 264/328.13 |
| 4,555,048 | 11/1985 | Hamman et al. . | |
| 4,568,006 | 2/1986 | Mueller et al. . | |
| 4,581,806 | 4/1986 | Minoshima | 264/254 |
| 4,618,078 | 10/1986 | Hammon et al. . | |
| 4,625,889 | 12/1986 | Baughman . | |
| 4,632,282 | 12/1986 | Nagashima . | |
| 4,695,420 | 9/1987 | Grawey et al. | 264/252 |
| 4,706,838 | 11/1987 | Von Holdt . | |
| 4,724,111 | 2/1988 | Iwata et al. | 264/266 |
| 4,781,012 | 11/1988 | Reil et al. . | |
| 4,855,094 | 8/1989 | Hendry | 264/328.13 |
| 5,004,126 | 4/1991 | Klesius . | |
| 5,108,687 | 4/1992 | Jourquin et al. . | |
| 5,116,556 | 5/1992 | Danton | 264/271.1 |
| 5,125,886 | 6/1992 | Dirksing . | |
| 5,147,591 | 9/1992 | Yoshida | 264/163 |
| 5,160,474 | 11/1992 | Huff . | |
| 5,171,508 | 12/1992 | Ishizu et al. | 264/252 |
| 5,221,028 | 6/1993 | Dwinell . | |
| 5,273,416 | 12/1993 | Heyn et al. | 264/252 |
| 5,288,448 | 2/1994 | Andersson | 264/268 |
| 5,354,532 | 10/1994 | Nakai et al. . | |
| 5,529,743 | 6/1996 | Powell | 264/513 |
| 5,656,228 | 8/1997 | Fujii et al. | 264/328.13 |

FOREIGN PATENT DOCUMENTS

| | | |
|---|---|---|
| 0 082 757 A1 | 6/1983 | European Pat. Off. . |
| 0 779 225 A1 | 6/1997 | European Pat. Off. . |
| 56-069136 | 6/1981 | Japan . |
| 57-156233 | 9/1982 | Japan . |
| 63-074617 | 4/1988 | Japan . |

*Primary Examiner*—Angela Ortiz
*Attorney, Agent, or Firm*—Austin R. Miller

[57] ABSTRACT

A method is provided for forming a recyclable plastic container component with an integral preform. A preform is placed within a mold recess. The mold is closed to capture the preform, thereby forming a flow passage with a shape corresponding to contours of the container component. Plastic is injected into the flow passage under pressure. The injected plastic bonds to an edge portion of the preform. The molded component is then cooled and removed from the mold.

16 Claims, 7 Drawing Sheets

METHOD OF FORMING A PLASTIC CONTAINER COMPONENT AND THE PLASTIC CONTAINER COMPONENT FORMED BY THE METHOD

BACKGROUND OF THE INVENTION

This invention provides a plastic container component and a method of forming a plastic container component. In particular, the method of this invention is capable of forming a plastic cover having a rigid body for locking to a container and a flexible pouring spout for emptying container contents without removing the cover.

FIELD OF THE INVENTION

It is often desirable to provide a cover that can be locked to a container and that has a spout for dispensing container contents without removing the cover. It is also desirable in some instances to provide a nestable spout so that containers can be stacked and shipped without damaging the spout.

Conventionally, assembled fittings are attached to container covers to serve these purposes. Such spouts are typically plastic with a metal ring for crimping the spout to a molded opening in the cover. An inner edge of the molded opening typically extends above the cover surface for attachment of the spout.

For example, U.S. Pat. No. 4,236,629 to Dwinell describes a pouring spout assembly with a sealing channel that rests on the neck of a pail opening and a metal crimping ring that surrounds the sealing channel. The crimping ring is deformed to lock the spout onto the neck.

Conventional crimping methods have significant disadvantages. For example, use of a crimping ring requires an additional crimping operation that adds expense to the manufacturing operation. Also, such crimps are sometimes defective and may result in containers that leak-so-called "leakers."

Crimping methods also require the use of a metallic ring. Such metallic components add cost and must be removed before recycling. This is a significant disadvantage in view of the current demand for recyclable products.

Additionally, crimping methods require the formation of a so-called "well" in the cover so that the top of the spout is flush with the top of the cover to permit stacking and avoid spout damage. Such a well compromises drainage of container contents.

Over the years, attempts have been made to overcome disadvantages of conventional manufacturing methods. For example, U.S. Pat. No. 5,221,028 to Dwinell describes a method of forming a pail cover assembly having a plastic closure joined to a plastic cover. A welding horn is intended to fuse a portion of a closure to the underface of a pail cover. Such methods require a separate sonic welding operation that adds expense to the product.

OBJECTS OF THE INVENTION

It is an object of this invention to provide a plastic container component and a method of forming a plastic container component that overcomes the disadvantages associated with the prior art.

It is another object to provide a method that does not require a separate operation for the attachment of a spout to a container cover.

Another object is to provide a method capable of forming a reliable liquid-tight seal between a plastic spout and a cover.

Yet another object is to provide a method that does not require the use of non-plastic components in a container cover.

An additional object is to provide a method that does not require providing a well in a container cover.

Other objects will be made clear in view of the following description.

SUMMARY OF THE INVENTION

A method is provided for forming an improved plastic container component with an integral plastic preform and a liquid-tight seal along an edge of the preform. A mold is provided with a recess shaped to accommodate the preform. When closed, the mold defines a flow passage corresponding to contours of the container component. The preform is positioned within the mold recess, thereby creating a barrier with the preform between the flow passage and recess. A portion of the preform extends into the flow passage. Molten plastic is injected into the flow passage under pressure and into intimate contact with the edge of the preform. The molten plastic is cooled and a liquid-tight bond is created at the preform edge. The container component is then removed from the mold.

DESCRIPTION OF THE INVENTION

The following description is intended to refer to a preferred embodiment of the invention as it is described with reference to the drawings. This description is not intended to define or limit the scope of the invention, which is defined separately in the claims that follow. Also, the drawings referred to throughout the following description are not to scale and are not intended to reflect actual dimensions or proportions.

Figure 1:
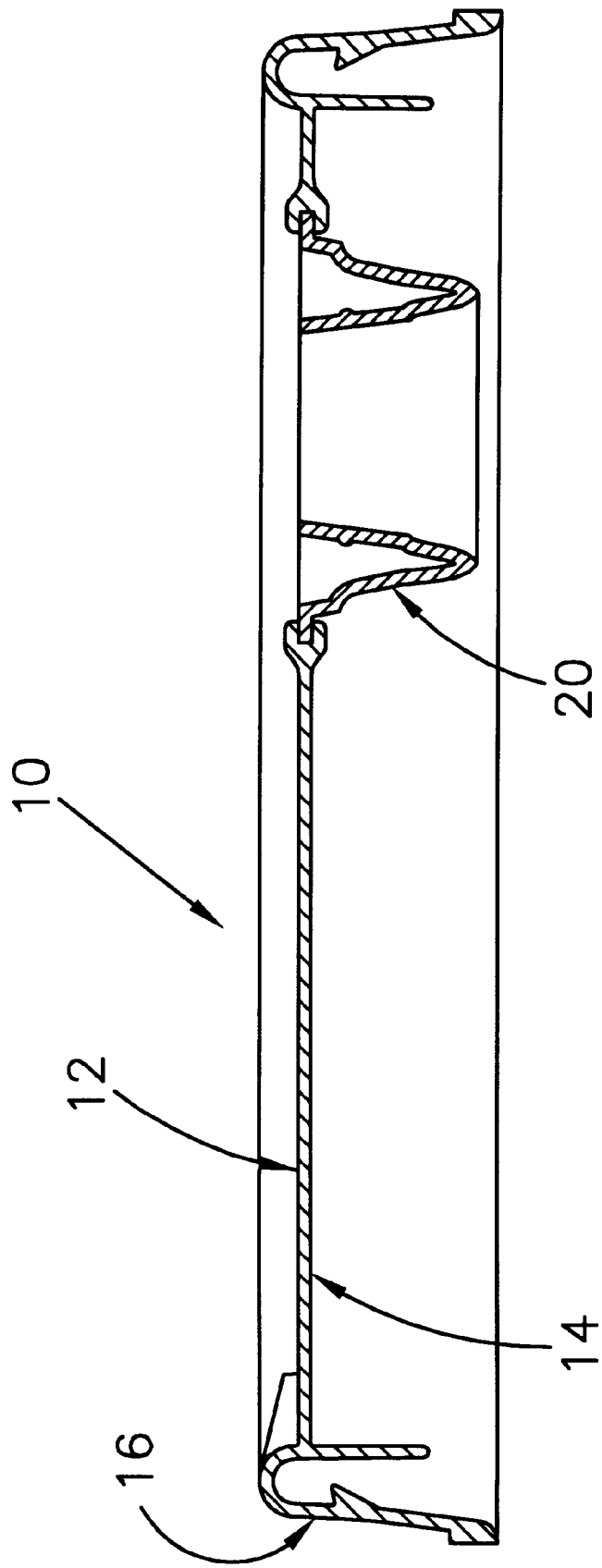
FIG. 1 is a cross-sectional side view of a container cover embodiment produced by a method according to this invention.
Figure 2A:
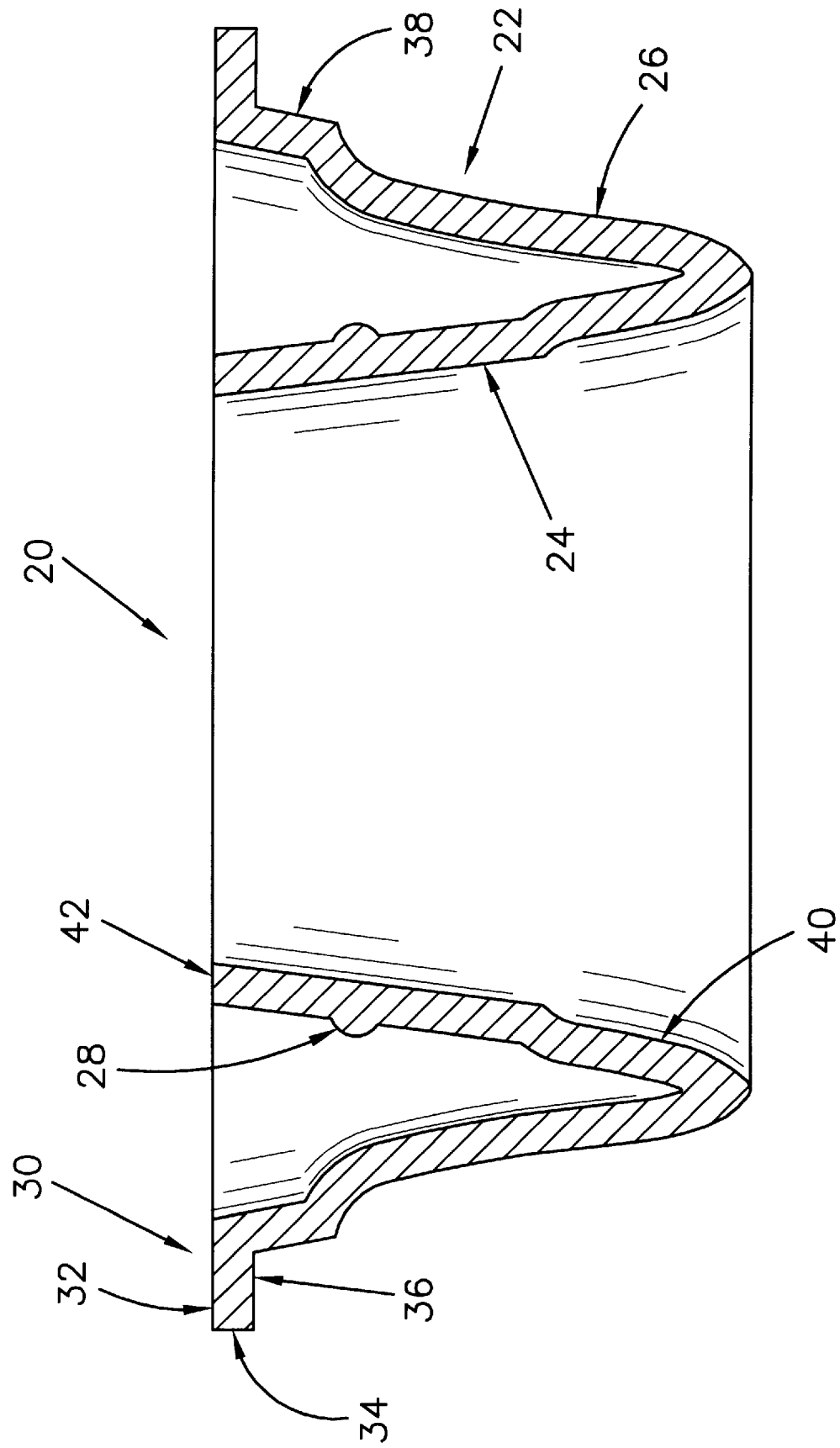
FIG. 2A is a cross-sectional side view of a flexible spout component of the container cover shown in FIG. 1.
Figure 2B:
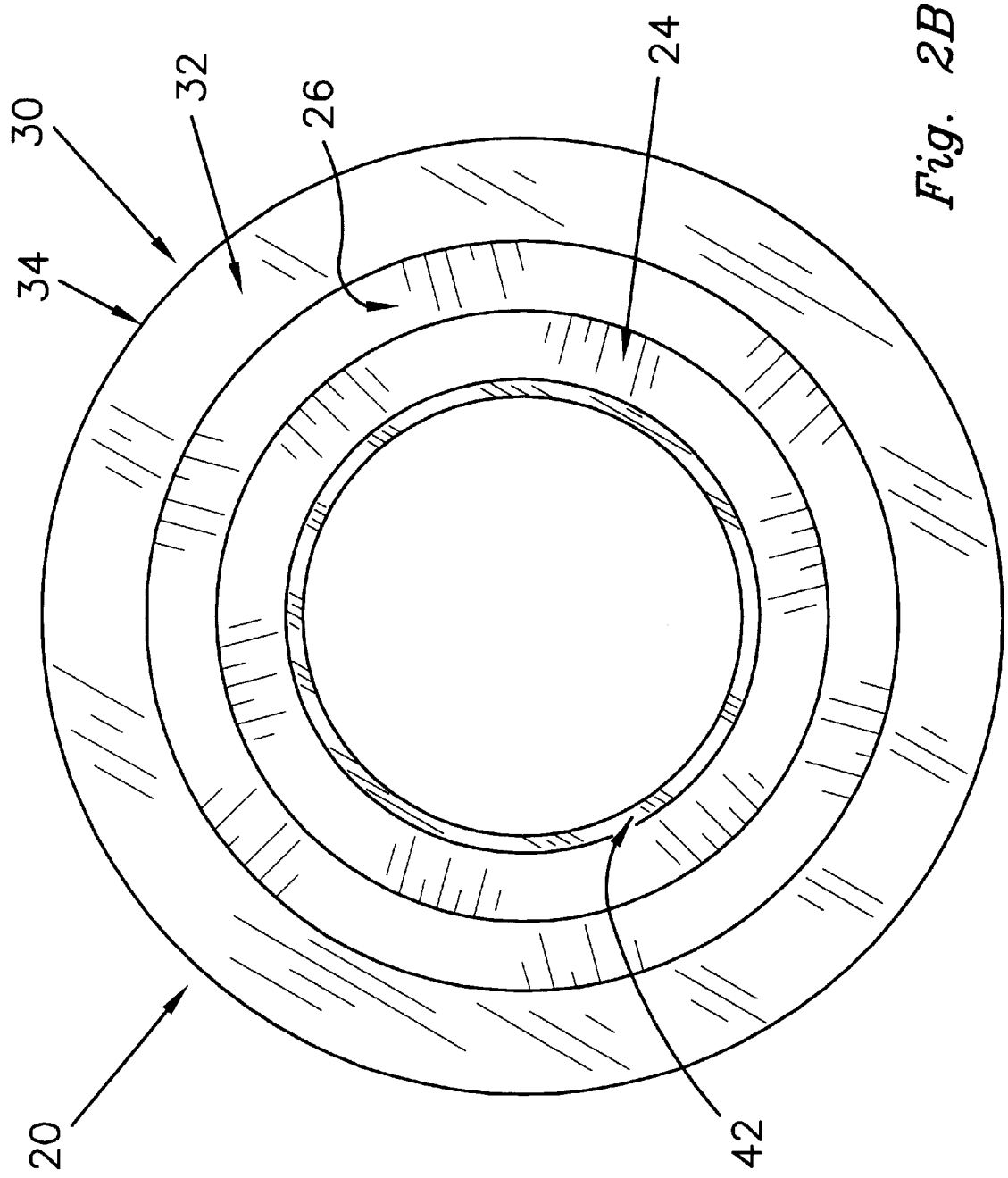
FIG. 2B is a top view of the flexible spout component shown in FIG. 2A.

FIGS. 1, 2A and 2B illustrate features of one embodiment of a container cover that is produced using the method of this invention. Referring to FIG. 1, the container cover is generally designated by the numeral "10" and is all plastic in construction. Most preferably, cover 10 is entirely recyclable.

Container cover 10 includes a cover body 12 that forms a major part of the cover. Cover body 12 is preferably formed from a recyclable plastic material. Most preferably, polyethylene or polypropylene is used to form cover body 12. Whatever plastic material is used, cover body 12 is preferably rigid enough to withstand stacking of containers for shipment or storage, forces encountered during container use or shipment, and any foreseeable forces that would otherwise separate a cover from a container.

Cover body 12 has a substantially flat or disk-shaped cover top 14 that terminates at its outer circumferential edge at a peripheral cover skirt 16. Cover skirt 16 is integrally formed with cover top 14 and has a locking mechanism that is particularly shaped for locking engagement with the upper portion of a container (not shown). A wide variety of locking mechanisms are optionally used, details of which need not be provided here. Many such locking mechanisms are known in the art.

Container cover 10 also includes a flexible spout 20 that is integrally bonded to cover top 14 of cover body 12. The manner in which cover body 12 and flexible spout 20 are combined to form container cover 10 will be described later.

Details of flexible spout 20 are illustrated in FIGS. 2A and 2B. Flexible spout 20 includes a spout wall 22 that is alternatively folded upon itself into a nested position (as shown in FIG. 2A) or extended to form a suitable pouring spout (the extended position is not shown). Spout wall 22, in the nested position, has a wall inner portion 24 and a wall outer portion 26. As will be understood by one of skill in this art, spout wall 22 has a substantially frustoconical shape when extended to dispense material from a container. Located on an outside surface of wall inner portion 24 is an optional thread bead 28 onto which a closure cap (not shown) is threaded, if desired.

Flexible spout 20 also has a flange 30 that extends radially outwardly from wall outer portion 26. It will be understood that flange 30 is located at a base of flexible spout 20 when the spout is in its extended position during use. As shown in FIG. 2A, flange 30 is located at the top end of wall outer portion 26. Flange 30 has a flange upper surface 32, a flange edge surface 34, and a flange lower surface 36. Below flange 30 on wall outer portion 26 is an outer surface 38, the significance of which will be made clear later. In this embodiment, outer surface 38 is substantially perpendicular to flange lower surface 36 of flange 30. Near the bottom of wall inner portion 24 (as shown in FIG. 2A) is an inner surface 40, the significance of which will become clear. At the top of wall inner portion 24 is an upper edge surface 42. As shown in FIG. 2A, upper edge surface 42 of wall inner portion 24 is substantially "flush" with flange upper surface 32 of flange 30. It is, of course, contemplated that upper edge surface 42 is optionally slightly above or below flange 30 when flexible spout 20 is in the nested position shown in FIGS. 2A and 2B. Upper edge surface 42 will be displaced to a position above flange 30 when flexible spout 20 is extended during use.

As shown in FIGS. 2A and 2B, flexible spout 20 provides an opening through which material in a container is dispensed or poured. Accordingly, flexible spout 20 provides a passage for material flow from the container interior without requiring removal of container cover 10 from the container.

Flexible spout 20 is preferably formed from a recyclable plastic material and is preferably more flexible than cover body 12 of cover 10. Such flexibility is optionally provided by forming flexible spout 20 from a material that is softer than the material used to form cover body 12. Alternatively, flexible spout 20 is formed from the same material as that in cover body 12, except that flexible spout 20 is provided with a different (thinner) wall thickness so that it is easily alternated between its nested position and its extended position.

Most preferably, flexible spout 20 is formed from polyethylene or polypropylene. Whatever material is selected, flexible spout 20 is preferably flexible enough to permit repeated movements between nested and extended positions.

FIGS. 3–6 illustrate details of an embodiment of a mold assembly, generally designated by the numeral "50", that is optionally used to perform the method of this invention. It will be understood that this invention is not limited to any particular mold configuration and that a wide variety of molds are optionally used.

Figure 3:
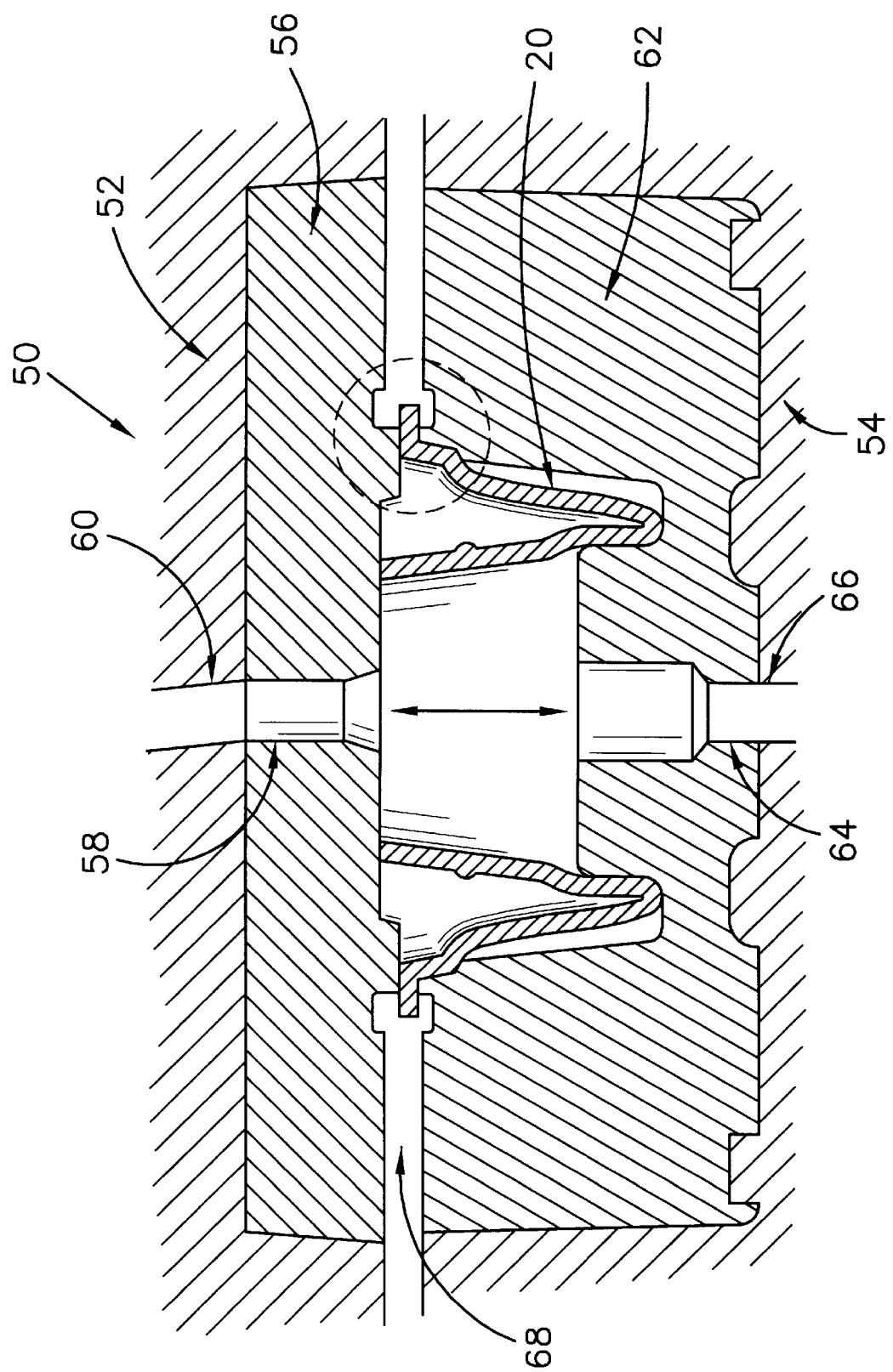
FIG. 3 is a cross-sectional side view of a mold assembly embodiment that is used in a method according to this invention.

Referring to FIG. 3, mold assembly 50 is shown in a closed position with a preform of flexible spout 20 captured in its interior. Mold assembly 50 includes the main components of a mold cavity 52 and a mold core 54. The mold components are preferably formed from a hardened tool steel such as P20 tool steel. Mold cavity 52 and mold core 54 are movable with respect to one another along a vertical mold access as indicated by the directional arrow in FIG. 3. More specifically, mold cavity 52 and/or mold core 54 are movable along the mold axis between an open position (separated from one another) and a closed position (adjacent one another).

Within mold cavity 52 is mounted a cavity insert 56. A screw clearance hole 58 is provided in cavity insert 56 and a standard screw (not shown) is threaded into female threads 60 in mold cavity 52 so that cavity insert 56 is securely mounted to mold cavity 52. Mold core 54 is provided with a core insert 62 that has a screw clearance hole 64 formed therein. A standard screw (not shown) is placed within screw clearance whole 64 and threaded into female threads 66 in mold core 54 in order to tightly attach core insert 62 to mold core 54.

When in the closed position shown in FIG. 3, mold cavity 52, mold core 54, cavity insert 56, and core insert 62 together define a flow passage 68 for molten plastic as will be described in detail later. Flow passage 68 has a shape generally corresponding to cover body 12 of container cover 10.

Figure 4:
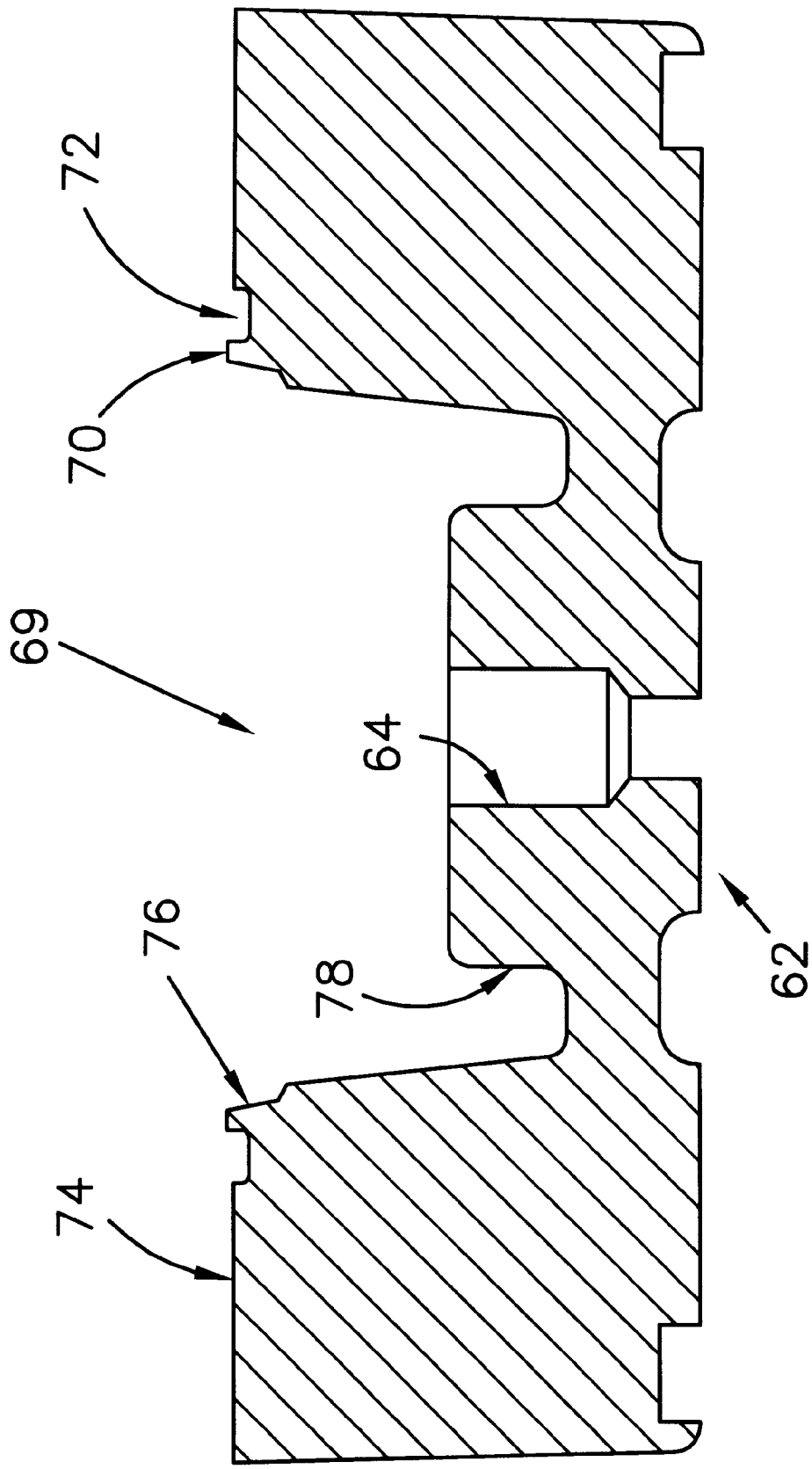
FIG. 4 is a cross-sectional side view of a core insert component of the mold assembly shown in FIG. 3.

Details of core insert 62 are illustrated in FIG. 4. Core insert 62 has a central recess 69 that is surrounded around its entire circumference by an upwardly-facing core sealing surface 70. Radially outwardly from core sealing surface 70 is a circumferential groove forming a recess 72. Recess 72 extends outwardly to a facing surface 74 of core insert 62. Core insert 62 also includes a counterbore 76 at the outer-most edge of central recess 69 adjacent to core sealing surface 70. Within central recess 69 is a centering plug 78, the significance of which is described later.

Figure 5:
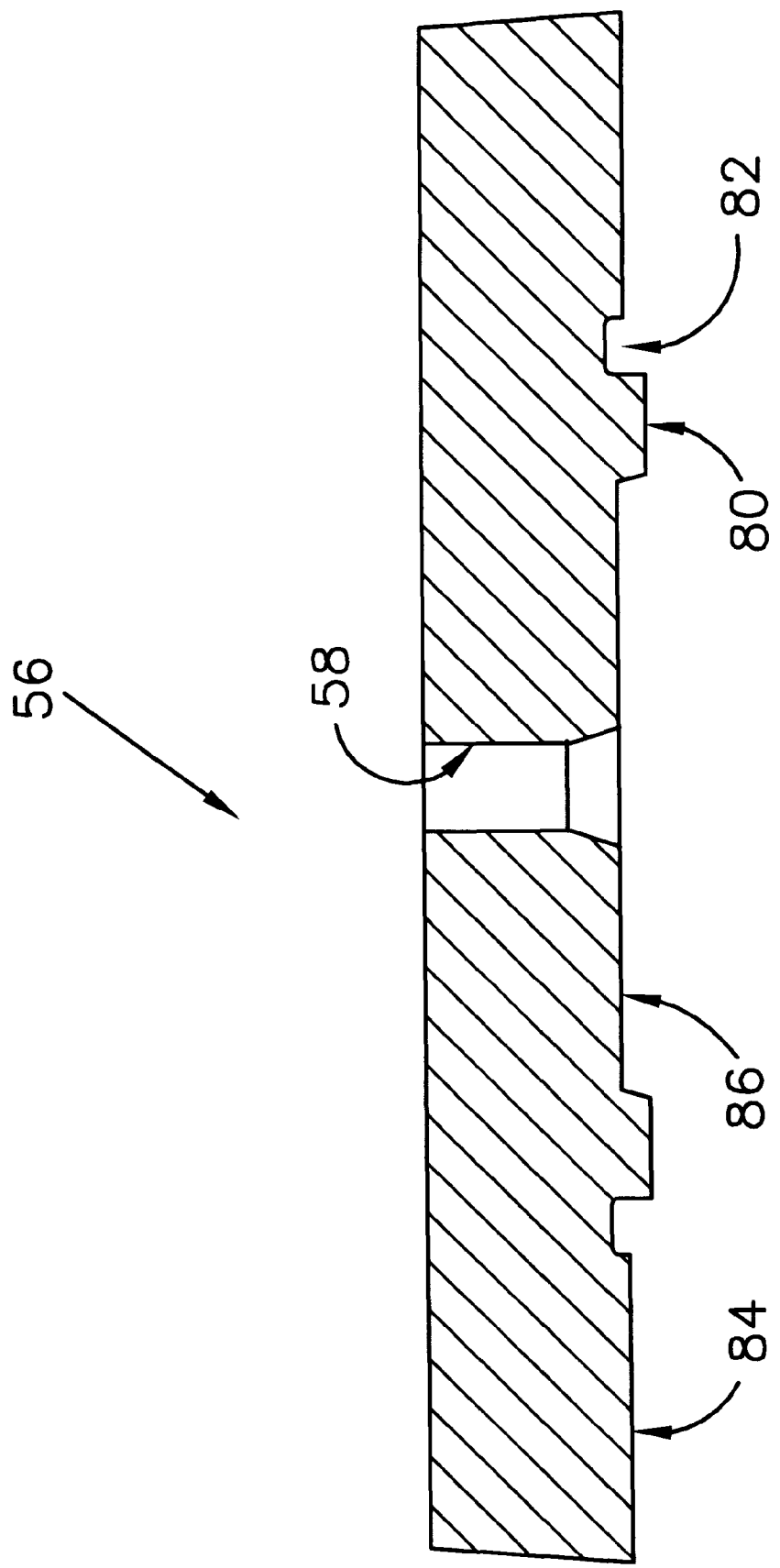
FIG. 5 is a cross-sectional side view of a cavity insert component of the mold assembly shown in FIG. 3.

Details of cavity insert 56 are illustrated in FIG. 5. Cavity insert 56 includes a downwardly-facing cavity sealing surface 80. Radially outwardly from cavity sealing surface 80 is a channel defining a circumferential recess 82. Outward of recess 82 is a downwardly-oriented facing surface 84. Also, cavity insert 56 includes a bearing surface 86 to the inside of cavity sealing surface 80.

Referring mainly to FIG. 3, the relationship between preformed flexible spout 20 and mold assembly 50 will now be described. When mold assembly 50 is in its open position (not shown), flexible spout 20 is positioned within central recess 69 of core insert 62. Centering plug 78 of core insert 62 fits snugly against inner surface 40 of flexible spout 20 to center flexible spout 20 in the mold. Also, outer surface 38 of flexible spout 20 fits snugly against counterbore 78 in core insert 62. Flange lower surface 36 of spout 20 rests against core sealing surface 70 of core insert 62.

Figure 6:
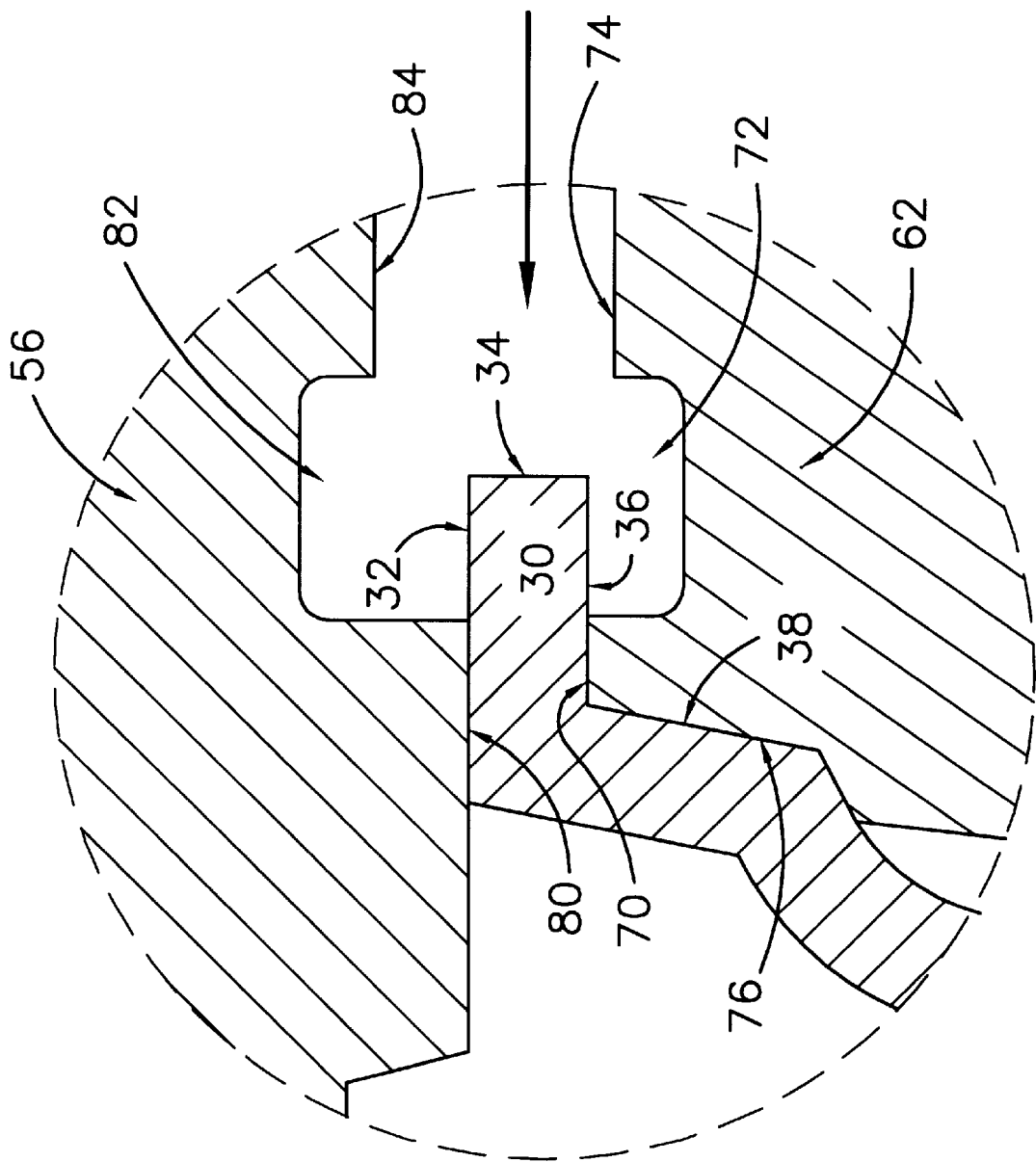
FIG. 6 is a cross-sectional side view illustrating details of a portion of the mold assembly shown in FIG. 3.

When mold assembly 50 is moved into its closed position as shown in FIG. 3, bearing surface 86 of cavity insert 56 contacts upper edge surface 42 of flexible spout 20. Perhaps best illustrated in FIG. 6, when mold assembly 50 is moved into its closed position, flange 30 of flexible spout 20 is captured between core sealing surface 70 of core insert 62 and cavity sealing surface 80 of cavity insert 56. Specifically, flange lower surface 36 of flexible spout 20 contacts core sealing surface 70 of core insert 62. Also, flange upper surface 32 of flexible spout 20 is contacted by cavity sealing surface 80 of cavity insert 56. In this position, the outermost portion of flange 30 of flexible spout 20 extends into flow passage 68. Accordingly, the portion of flow passage 68 shown in FIG. 6 is defined by recess 72 and facing surface 74 of core insert 62; recess 82 and facing surface 84 of cavity insert 56; and flange upper surface 32, flange edge surface 34, and flange lower surface 36 of flexible spout 20.

A preferred method according to this invention will now be described with reference to the figures. A pre-formed spout such as flexible spout 20 is provided as a component of a container cover. Flexible spout 20 is optionally provided in a variety of sizes and shapes, depending upon the configuration of the container cover to be formed and the size of the dispensing opening desired. It is of course contemplated that the flexible spout can have a wide variety of shapes and sizes.

While mold assembly 50 is in an open position (not shown), flexible spout 20 is positioned within central recess 69 of core insert 62 until the inner surface 40 and outer surface 38 of the flexible spout 20 engages the centering plug 78 and counterbore 76 of the core insert 62, respectively. Placement of flexible spout 20 within core insert 62 can be accomplished in a wide variety of manners, including manual positioning by a mold operator, automated insertion by a robot, timed delivery from a conveyor, or any other known manner. However performed, it is preferable that flexible spout 20 is carefully installed so that flange lower surface 36 of flexible spout 20 contacts core sealing surface 70 of core insert 62. After insertion, upper edge surface 42 of flexible spout 20 should be facing bearing surface 86 of cavity insert 56.

Mold assembly 50 is then moved into the closed position shown in FIG. 3 by bringing mold cavity 52 and cavity insert 56 adjacent to mold core 54 and core insert 62. In the closed position, cavity sealing surface 80 of cavity insert 56 contacts flange upper surface 32 of flexible spout 20.

Preferably, flange 30 is pinched tightly between core sealing surface 70 and cavity sealing surface 80. In this preferred position, a 360° seal is created between flange upper surface 32 and cavity sealing surface 80 and between flange lower surface 36 and core sealing surface 70. Most preferably, flange 30 is compressed to some extent (perhaps about 0.018 inches) between the core and cavity inserts. Some amount of compression is preferred to form a seal so that pressurized molten plastic in flow passage 68 will not bypass the surfaces of flange 30 and escape into recess 69 of core insert 62.

At this point, it is apparent that flow passage 68 is defined in part by flange upper surface 32, flange edge surface 34, and flange lower surface 36 of flange 30; core sealing surface 70, recess 72, and facing surface 74 of core insert 62; and cavity sealing surface 80, recess 82, and facing surface 84 of cavity insert 56. Flow passage 68 conforms substantially to the desired shape of cover body 12. It is of course contemplated that material shrinkage and other factors are considered in determining the exact dimensions and configuration of flow passage 68.

Molten plastic (such as polyethylene, polypropylene or another suitable polymer) is then injected under pressure, using a conventional injection molding machine, into flow passage 68. The plastic material is delivered at an elevated temperature in the general direction indicated by the arrow in FIG. 6. For example, if polyethylene or polypropylene material is used, heating to approximately 450° F. is preferred.

The molten plastic is quickly injected into the flow passage 68 under pressure so that the molten plastic completely fills all contours of flow passage 68. According to one preferred method, the injection molding process is advantageously completed in two sequential phases-a high-pressure injection followed substantially immediately by a low-pressure injection.

The high-pressure injection phase is most preferably performed for approximately two seconds with molten plastic pressures between about 10,000 pounds per square inch (psi) and about 15,000 psi. The high-pressure injection phase rapidly injects the molten plastic into the mold cavity.

The low-pressure injection phase is most preferably performed for approximately one second with molten plastic pressures between about 6,000 psi and about 10,000 psi. The low-pressure injection phase encourages the flow of molten plastic into mold cavity crevices and encourages bonding and fusing between the injected plastic and the spout flange.

Other molding pressures and durations are of course contemplated. Adjustments are made depending upon the size and shape of the product to be molded as well as the molding material used.

As the molten plastic flows into the space between the core and the cavity (flow passage 68), it contacts and surrounds the exposed flange area up to the pinch-off point. In other words, molten plastic flows into recesses 72 and 82 and contacts the surfaces of flange 30 but does not flow beyond sealing surfaces 70 and 80 of the core and cavity inserts.

The manner in which pressurized and molten plastic contacts the spout flange uniquely results in a permanent and reliable bond to create a unitary cover. The elevated temperature of the molten plastic causes the surfaces of the flange to at least partially melt so that the flange material flows into the injected plastic and vice versa. Also, the elevated pressure of the injected molten plastic forces the molten plastic into intimate contact with the flange, thereby assuring a complete bond that is most preferably formed on three surfaces of the flange. The resulting product has a one-piece integral construction.

It has been discovered that the best results are obtained when the spout is preformed from low-density polyethylene (LDPE) and high-density polyethylene (HDPE) is injected to form the cover body. This combination provides the spout with a preferred flexibility and the cover body with a preferred rigidity. However, other materials and material combinations are contemplated. It is also contemplated that the spout and cover body are optionally formed from the same material such as polypropylene or LDPE.

Once the molten plastic has been injected into the space between the core and the cavity, the molten plastic is permitted to cool and solidify to form cover body 12 of container cover 10. The cooling stage is preferably long enough to allow the molten plastic to crystallize into a solid form. Most preferably, the cooling stage has a duration of about six seconds. The mold assembly 50 is then moved from its closed position into its open position by separating mold cavity 52 and cavity insert 56 from mold core 54 and core insert 62. Thereafter, the molded container cover is removed or ejected from the mold and the process is repeated.

The resulting product (container cover 10) has a permanently fused bond between the flexible spout 20 and container body 12, thereby providing a 360° leak-proof seal between the spout and the cover. Container cover 10 is ejected from mold assembly 50 as a complete part—no secondary operation need be performed to install a fitting.

Although one particular method according to this invention has been described with reference to illustrative molded products and molding equipment, it is of course contemplated that many modifications are optionally made without departing from the spirit or the scope of this invention. For example, the order of the steps of the method is optionally altered depending upon the specific product being produced and other manufacturing considerations. Also, although several specific polymers are described as preferable, it is of course contemplated that those materials are optionally substituted for other materials and that the method parameters are optionally adjusted accordingly.

It is contemplated that the method of this invention is optionally modified in other ways. For example, a plastic preform corresponding in shape to cover body 12 is optionally positioned in a mold having a recess to accommodate the preform. Molten plastic is optionally injected into a flow passage to form the spout 20 and complete the cover. In other words, the method of this invention produces any container component by providing a plastic preform of any configuration, placing the preform in a mold having a recess for the preform and a flow passage, and injecting molten plastic into the flow passage so that a portion of the preform bonds to the injected plastic.

Also, the method of this invention is optionally used to produce any plastic product wherein a plastic preform is fused or bonded to injected molten plastic. The product need not be a container cover—the benefits of this invention apply to any plastic component. Also, the configuration of the formed product is optionally modified. For example, the "joint" between the preform and the injection molded plastic is optionally modified from the one illustrated in the drawings. It is most preferable for the fused bond to be formed at multiple surfaces such as upper surface 32, outer edge surface 34 and lower surface 36 of flange 30 (FIG. 3). It is also preferable for the bond to be made to at least two such surfaces (i.e., an upper surface and a lower surface, an upper surface and an edge surface, an edge surface and a lower surface, etc.). However, a wide variety of configurations is contemplated. For example, an edge of a preform optionally defines a channel that captures (and is bonded to) plastic that is injection molded into the channel.

Other configurations are also contemplated, limited only by the imagination of the product designer or manufacturer. In other words, the method of this invention optionally produces any plastic container component with an integral plastic preform wherein an edge portion of the preform is bonded to or melted into an injection molded portion of the container component. Only one of many possible container components is illustrated in FIG. 1.

In any embodiment, this invention provides several benefits. For example, when used to form a container cover, the method eliminates any need for a post-molding operation to affix a spout fitting. Also, the method so applied provides a reliable and leak-tight seal between the cover components.

Furthermore, the method of this invention is capable of producing an improved container cover. A completely recyclable plastic cover is optionally made according to this invention, thereby eliminating the time and expense associated with removal of non-recyclable components such as metal crimping rings prior to recycling. Also, the method of this invention is optionally used to form a cover having a nested spout that is flush with the cover top without requiring a cover well so that the covered container is stackable and fully drainable. These and other benefits are conferred by this invention, which is defined separately in the claims that follow.

What is claimed is:

1. A method of forming a plastic container component with an integral plastic preform adapted to permit drainage of contents from a container, wherein a liquid-tight seal is provided at an edge portion of said preform, said method comprising the steps of:

(a) in a preceding operation, providing a plastic preform defining a drainage opening through which said drainage of contents can be accomplished;

(b) providing a container component mold, said mold defining a recess shaped to substantially center said preform within said recess, said mold also defining a mold passage substantially corresponding in shape to said container component, said mold passage being positioned adjacent to said recess;

(c) placing said preform within said recess defined by said mold;

(d) creating a barrier with said preform between said mold passage and said recess and extending said edge portion of said preform into flow communication with said flow passage;

(e) injecting molten plastic into said mold passage under pressure and into intimate contact with said edge portion of said preform, thereby causing a surface of said edge portion to at least partially melt; and (f) cooling said molten plastic and creating a liquid-tight and permanently fused bond at said edge portion of said preform.

2. A method of forming a plastic cover with an integral plastic preform adapted to permit drainage of contents through said cover, wherein a liquid-tight seal is provided at an edge portion of said preform, said method comprising the steps of:

(a) in a preceding operation, providing a plastic preform defining a drainage opening through which said drainage of contents can be accomplished, said preform having a substantially continuous edge portion;

(b) providing a mold with mold sections movable with respect to one another, an open position with said mold sections separated from one another and a closed position with said mold sections adjacent one another, said mold in said closed position defining a recess shaped to substantially center said preform within said recess and a mold passage having a shape substantially corresponding to said cover, said mold passage being positioned adjacent to said recess;

(c) placing said preform within said recess defined by said mold and capturing said preform within said recess;

(d) creating a barrier with said preform between said mold passage and said recess and extending said edge portion of said preform into flow communication with said mold passage;

(e) injecting molten plastic into said mold passage under pressure and causing intimate contact between said molten plastic and said edge portion of said preform; and (f) cooling said molten plastic and integrally bonding injected plastic to said edge portion of said preform to form a permanently fused bond therebetween.

3. The method defined in claim 2, wherein said edge portion of said preform has an upper surface, an outer edge surface and a lower surface, and wherein said step of cooling said molten plastic provides a bond between said injected plastic and at least one of said upper surface, said outer edge surface and said lower surface of said edge portion.

4. A method of forming a plastic cover with an integral plastic preform adapted to permit drainage of contents through said cover wherein a liquid-tight seal is provided at an edge portion of said preform, said method comprising the steps of:

(a) in a preceding operation, providing a plastic preform defining a drainage opening through which said drainage of contents can be accomplished, said preform having a substantially continuous edge portion;

(b) providing a mold with mold sections movable with respect to one another, an open position with said mold sections separated from one another and a closed position with said mold sections adjacent one another, said mold in said closed position defining a recess shaped to accommodate said preform and a flow passage having, a shape substantially corresponding to contours of said cover, said flow passage being positioned adjacent to said recess;

(c) placing said preform within said recess defined by said mold and capturing said preform within said recess;

(d) creating a barrier with said preform between said flow passage and said recess and extending said edge portion of said preform into flow communication with said flow passage;

(e) injecting molten plastic into said flow passage under pressure and causing intimate contact between said molten plastic and said edge portion of said preform;

(f) cooling said molten plastic and integrally bonding injected plastic to said edge portion of said preform to form a permanently fused bond therebetween; and wherein the step of injecting said molten plastic includes:
injecting said molten plastic under a first pressure for a first duration and rapidly filling said flow passage with said molten plastic; and
injecting said molten plastic under a second pressure for a second duration and urging said molten plastic into said intimate contact with said edge portion of said preform, wherein said second pressure is lower than said first pressure and said second duration is shorter than said first duration.

5. The method described in claim 4, wherein said first pressure is maintained from about 10,000 to about 15,000 psi.

6. The method defined in claim 4, wherein said second pressure is maintained from about 6,000 psi to about 10,000 psi.

7. The method defined in claim 4, wherein said first duration is about two seconds.

8. The method defined in claim 4, wherein said second duration is about one second.

9. The method defined in claim 2, wherein said preform is formed from a material selected from a group consisting of low-density polyethylene, high-density polyethylene, and polypropylene.

10. The method defined in claim 2, wherein said molten plastic is selected from a group consisting of low-density polyethylene, high-density polyethylene, and polypropylene.

11. A method of forming a recyclable plastic cover having a substantially rigid body for mounting said cover to a container, a flexible fitting for drainage of contents of said container, and a liquid-tight bond between said flexible fitting and said rigid body, said method comprising the steps of:

(a) in a preceding operation, providing a flexible plastic preform defining said flexible fitting, said flexible plastic preform having a neck portion and a circumferential portion extending radially outwardly from said neck portion, said circumferential portion having an upper surface, an outer edge surface and a lower surface;

(b) providing a cover mold having sections movable with respect to one another along a molding axis, said cover mold having an open position with said sections separated from one another and a closed position with said sections adjacent one another, said cover mold in said closed position defining a recess shaped to substantially center said flexible plastic preform within said recess and a mold passage having a shape substantially corresponding to said rigid body, said mold passage being positioned adjacent to said recess;

(c) placing said flexible plastic preform within said recess while said cover mold is in said open position;

(d) moving said cover mold into said closed position and capturing said flexible plastic preform within said recess;

(e) creating a seal between a section of said cover mold and said upper surface of said circumferential portion and between a section of said cover mold and said lower surface of said circumferential portion to provide a barrier between said mold passage and said recess, wherein said circumferential portion is compressed by said cover mold sections;

(f) injecting molten plastic into said mold passage under pressure and causing intimate contact between said molten plastic and at least one of said upper surface, said lower surface and said outer edge surface of said circumferential portion of said flexible plastic preform;

(g) melting at least a portion of said circumferential portion in said intimate contact with said molten plastic;

(h) cooling said molten plastic and integrally bonding said rigid body to said circumferential portion of said flexible plastic preform to form a permanently fused bond therebetween; and (i) removing said cover from said cover mold.

12. A method of forming a recyclable plastic cover having a substantially rigid body for mounting said cover to a container, a flexible fitting for drainage of contents of said container, and a liquid-tight bond between said flexible fitting and said rigid body, said method comprising the steps of:

(a) in a preceding operation, providing a flexible plastic preform defining said flexible fitting, said flexible plastic preform having a neck portion and a circumferential portion extending radially outwardly from said neck portion, said circumferential portion having an upper surface, an outer edge surface and a lower surface;

(b) providing a cover mold having sections movable with respect to one another along a molding axis, said cover mold having an open position with said sections separated from one another and a closed position with said sections adjacent one another, said cover mold in said closed position defining a recess shaped to accommodate said flexible plastic preform and a flow passage having a shape substantially corresponding to said rigid body, said flow passage being positioned adjacent to said recess;

(c) placing said flexible plastic preform within said recess while said cover mold is in said open position;
(d) moving, said cover mold into said closed position and capturing said flexible plastic preform within said recess;
(e) creating a seal between a section of said cover mold and said upper surface of said circumferential portion and between a section of said cover mold and said lower surface of said circumferential portion to provide a barrier between said flow passage and said recess, wherein said circumferential portion is compressed by said cover mold sections;
(f) injecting molten plastic into said flow passage under pressure and causing intimate contact between said molten plastic and at least one of said upper surface said lower surface and said outer edge surface of said circumferential portion of said flexible plastic preform;
(g) melting at least a portion of said circumferential portion in said intimate contact with said molten plastic;
(h) cooling said molten plastic and integrally bonding said rigid body to said circumferential portion of said flexible plastic preform to form a permanently fused bond therebetween;
(i) removing said cover from said cover mold; and wherein the step of injecting said molten plastic includes:
   injecting said molten plastic under a first pressure for a first duration and rapidly filling said flow passage with said molten plastic; and
   injecting said molten plastic under a second pressure for a second duration and urging said molten plastic into said intimate contact with said circumferential portion, wherein said second pressure is lower than said first pressure and said second duration is shorter than said first duration.

13. The method described in claim 12, wherein said first pressure is maintained from about 10,000 to about 15,000 psi.

14. The method defined in claim 12, wherein said second pressure is maintained from about 6,000 psi to about 10,000 psi.

15. The method defined in claim 12, wherein said first duration is about two seconds.

16. The method defined in claim 12, wherein said second duration is about one second.

* * * * *